(12) United States Patent
Mori (10) Patent No.: US 9,939,317 B1
(45) Date of Patent: Apr. 10, 2018

(54) FLAME DETECTING SYSTEM (71) Applicant: Azbil Corporation, Tokyo (JP)

(72) Inventor: Raita Mori, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 15/816,234

(22) Filed: Nov. 17, 2017

(30) Foreign Application Priority Data

Nov. 21, 2016 (JP) .................... 2016-225892

(51) Int. Cl.
*G01J 1/42* (2006.01)
*H01J 40/14* (2006.01)
*G01J 1/44* (2006.01)

(52) U.S. Cl.
CPC .............. *G01J 1/429* (2013.01); *G01J 1/44* (2013.01); *H01J 40/14* (2013.01); *G01J 2001/4446* (2013.01)

(58) Field of Classification Search
CPC .. F23N 2029/00; G08B 17/125; G01J 5/0014; G01J 5/0018
See application file for complete search history.

(56) References Cited

U.S. PATENT DOCUMENTS

| 5,227,640 A * | 7/1993 | Nomura ................. F23N 5/082 250/372 |
| 5,256,057 A * | 10/1993 | Grow ..................... F23N 5/082 431/25 |
| 2005/0174244 A1* | 8/2005 | Grow ..................... F23N 5/082 340/577 |

FOREIGN PATENT DOCUMENTS

| JP | 2011-141290 A | 7/2011 |
| JP | 2013-210284 A | 10/2013 |

* cited by examiner

*Primary Examiner* — Kenneth J Malkowski
(74) *Attorney, Agent, or Firm* — Amster, Rothstein & Ebenstein LLP (57) ABSTRACT

A sensitivity parameter storing portion stores, as known sensitivity parameters owned by a flame sensor, a reference received light quantity, a reference pulse width, a probability of regular discharge, and probabilities of non-regular discharge in advance. The discharge probability is calculated based on a number drive pulses applied to the flame sensor and a number of discharges determined to have occurred in the flame sensor having received the drive pulses. The calculated discharge probability and the known sensitivity parameters are used to calculate a received light quantity per unit time received by the flame sensor. A pulse width correcting portion is provided to correct the pulse width of the drive pulses generated by an applied voltage generating circuit so that the discharge probability equals a target discharge probability.

3 Claims, 8 Drawing Sheets

FLAME DETECTING SYSTEM

CROSS-REFERENCE TO RELATED APPLICATION

The present application claims the benefit of and priority to Japanese Patent Application No. 2016-225892, filed on Nov. 21, 2016, the entire contents of which are incorporated by reference herein.

TECHNICAL FIELD

The present invention relates to a flame detecting system that detects the presence or absence of a flame.

BACKGROUND ART

There is a conventionally known electron tube used to detect the presence or absence of a flame on the basis of ultraviolet rays emitted from a flame in a combustion furnace or the like. The electron tube includes a sealed container in which predetermined gas is filled in a sealing manner, two electrode supporting pins that penetrate through both end portions of the sealed container, and two electrodes (a pair of electrodes) that are supported in parallel with each other by the electrode supporting pins within the sealed container.

In the electron tube, when one electrode facing a flame is irradiated with ultraviolet rays in a state where a predetermined voltage is applied across the electrodes through the electrode supporting pins, electrons are emitted from the one electrode due to the photoelectric effect and excited in succession one after another to cause an electron avalanche between the one electrode and the other electrode. Therefore, it is possible to detect the presence or absence of a flame by measuring a change in impedance between the electrodes, a change in voltage between the electrodes, and a change in current flowing between the electrodes. Various methods for detecting the presence or absence of a flame have been suggested.

Of these methods, for example, there is one proposed method in which current flowing between the electrodes is integrated and the presence of a flame is determined when the integrated value is greater than or equal to a predetermined threshold value or the absence of a flame is determined when the integrated value is less than the predetermined threshold value (see, for example, PTL 1).

However, since this method integrates the current flowing between the electrodes, the time for integration is required even in flame extinction. Accordingly, it takes time until flame extinction is detected, consequently making it difficult to detect the presence or absence of a flame rapidly.

In order to solve the problems described above, the flame detecting device disclosed in PTL 2 includes an electron tube in which a pair of electrodes are provided and electrons are emitted between the electrodes when the electrodes are irradiated with ultraviolet rays, an applying portion that applies a periodically changing voltage across the electrodes, a detecting portion that detects a voltage waveform representing a temporal change of the voltage between the electrodes, and an determining portion that determines the presence or absence of a flame on the basis of the voltage waveform detected by the detecting portion.

Since the flame detecting device disclosed in PTL 2 determines the presence or absence of a flame on the basis of the voltage waveform representing the temporal change of the voltage between the electrodes provided in the electron tube, the time for integration or the like is not required and the presence or absence of a flame can be detected rapidly.

CITATION LIST

Patent Literature

[PTL 1] JP-A-2011-141290
[PTL 2] JP-A-2013-210284

SUMMARY

However, the flame detecting device disclosed in PTL 2 needs to monitor the voltage waveform representing the temporal change of the voltage between the electrodes and to perform signal processing in an analog manner in order to find the rise, fall, and the like on the basis of the monitored voltage waveform, so the implementation of the flame detecting device is not easy.

The invention addresses the above problems with an object of providing a flame detecting system capable of detecting the presence or absence of a flame accurately in a simple structure without the need for signal processing in an analog manner.

To achieve the above object, according to the invention, there is provided a flame detecting system including a flame sensor (1) configured to have a pair of electrodes and detect light generated from a flame; an applied voltage generating portion (12) configured to periodically generate a pulsed voltage and apply the voltage across the pair of electrodes of the flame sensor as drive pulses; a current detecting portion (15) configured to detect current flowing through the flame sensor; a storing portion (19) for storing, as known sensitivity parameters owned by the flame sensor, at least a reference received light quantity $Q_0$ of the flame sensor, a reference pulse width $T_0$ of the drive pulses applied across the pair of electrodes of the flame sensor, a probability $P_0$ of regular discharge generated between the pair of electrodes, and a probability $P_N$ of discharge other than the regular discharge, a received light quantity of the flame sensor being the reference received light quantity $Q_0$, a pulse width of the drive pulses applied to the flame sensor being the reference pulse width $T_0$; a number-of-discharges counting portion (201) configured to count the number n of discharges determined to have occurred across the pair of electrodes of the flame sensor based on the current detected by the current detecting portion when the drive pulses generated by the applied voltage generating portion are applied across the pair of electrodes of the flame sensor; a received light quantity calculating portion (203) configured to calculate a received light quantity Q per unit time received by the flame sensor based on the known sensitivity parameters stored in the storing portion, a pulse width T and a number N of the drive pulses applied across the pair of electrodes of the flame sensor by the applied voltage generating portion, and the number n of discharges counted by the number-of-discharges counting portion when the drive pulses are applied across the pair of electrodes of the flame sensor; and a pulse width correcting portion (204) configured to correct the pulse width T of the drive pulses generated by the applied voltage generating portion so that a discharge probability P obtained based on the number N of the drive pulses and the number n of discharges equals a preset target discharge probability $P_{TG}$.

In the invention, the pulsed voltage is periodically applied to the flame sensor as drive pulses. In addition, the storing portion stores, as the known sensitivity parameters owned by the flame sensor, the reference received light quantity $Q_0$, the reference pulse width $T_0$, the probability $P_0$ of regular discharge, and the probability $P_N$ of discharge other than the regular discharge. The received light quantity calculating portion calculates the received light quantity Q per unit time received by the flame sensor based on the known sensitivity parameters (reference received light quantity $Q_0$, reference pulse width $T_0$, probability $P_0$ of regular discharge, and probability $P_N$ of discharge other than the regular discharge) stored in the storing portion, the pulse width T and the number N of the drive pulses applied across the pair of electrodes of the flame sensor, and the number n of discharges counted when the drive pulses are applied across the pair of electrodes of the flame sensor.

In the invention, the pulse width T of the drive pulses applied to the flame sensor is known, the reference received light quantity $Q_0$, the reference pulse width $T_0$, the probability $P_0$ of regular discharge, and the probability $P_N$ of discharge other than the regular discharge are also stored as known sensitivity parameters, and the pulse width T of the drive pulses applied across the pair of electrodes of the flame sensor is also known, so it is possible to calculate the received light quantity Q per unit time received by the flame sensor based on the number N of the drive pulses applied to the flame sensor and the number n of discharges determined to have occurred in the flame sensor having received the drive pulses. The presence or absence of a flame can be detected based on the calculated received light quantity Q. In addition, in the invention, the known sensitivity parameters used to calculate the received light quantity Q include the probability $P_N$ of discharge other than the regular discharge in addition to the probability $P_0$ of regular discharge. With this, the presence or absence of a flame can be detected accurately.

In addition, in the invention, the pulse width T of the drive pulses generated by the applied voltage generating portion is corrected so that the discharge probability P obtained based on the number N of the drive pulses and the number n of discharges equals the target discharge probability $P_{TG}$. For example, the known sensitivity parameters (the reference received light quantity $Q_0$, the reference pulse width $T_0$, probability $P_0$ of regular discharge, and the probability $P_N$ of discharge other than regular discharge) stored in the storing portion, the received light quantity Q per unit time calculated by the received light quantity calculating portion, and the target discharge probability $P_{TG}$. are used to calculate the correction value $T_{new}$ of the pulse width T of the drive pulses.

With this, the pulse width T of the drive pulses is always adjusted so that the discharge probability P equals the target discharge probability $P_{TG}$ and the drive pulses having the adjusted pulse width T are applied to the flame sensor. Since heat caused by discharge increases the electrode temperature of the flame sensor when the discharge probability P is increased, the relationship between the received light quantity of and the discharge probability becomes undefined and the accuracy of the received light quantity estimated based on the discharge probability may be reduced. Since the pulse width T of the drive pulses is adjusted so that the discharge probability P equals the target discharge probability $P_{TG}$ in the invention, the accuracy of the received light quantity, which is estimated based on the discharge probability, can be improved by keeping the electrode temperature of the flame sensor constant. With this, the presence or absence of a flame can be detected more accurately.

In the invention, the electrode temperature of the flame sensor may be detected and the pulse width T of the drive pulses may be further corrected based on the difference between the detected electrode temperature and the preset reference electrode temperature. In addition, the pulse width correcting portion may calculate the correction value $T_{new}$ of the pulse width T of the drive pulses using the known sensitivity parameters stored in the storing portion, the received light quantity Q per unit time calculated by the received light quantity calculating portion, and the target discharge probability $P_{TG}$.

In the above description, the components in the drawings corresponding to components of the invention are indicated by reference numerals enclosed in parentheses.

As described above, according to the invention, the received light quantity Q per unit time received by the flame sensor is calculated based on the reference received light quantity $Q_0$, the reference pulse width $T_0$, the probability $P_0$ of regular discharge, and the probability $P_N$ of discharge other than regular discharge stored as the known sensitivity parameters, the pulse width T and the number N of the drive pulses applied across the pair of electrodes of the flame sensor, and the number n of discharges counted when the drive pulses are applied across the pair of electrodes of the flame sensor. The pulse width T of the drive pulses is corrected so that the discharge probability P obtained based on the number N of the drive pulses and the number n of discharges equals the target discharge probability $P_{TG}$, so the presence or absence of a flame can be detected accurately in a simple structure.

DETAILED DESCRIPTION

Embodiments of the invention will be described in detail below with reference to the drawings. First, a flame detecting system will be described as a reference example before embodiments of the invention are described.

Reference Example

Figure 1:
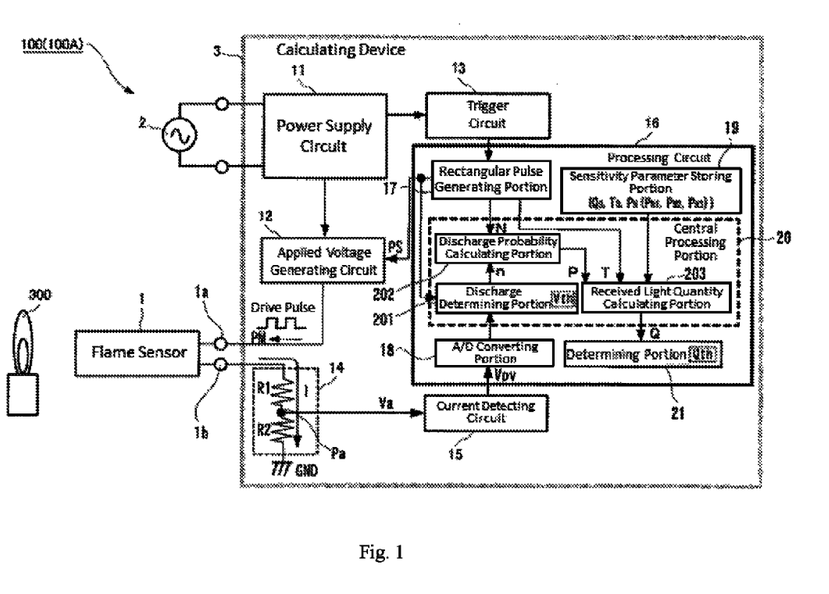
FIG. 1 illustrates the main part of a flame detecting system as a reference example before embodiments of the invention are described.

FIG. 1 illustrates the main part of a flame detecting system 100 (100A). The flame detecting system 100A includes a flame sensor 1, an external power supply 2, and a calculating device 3 to which the flame sensor 1 and the external power supply 2 are connected.

Although not illustrated, the flame sensor 1 has an electron tube including a cylindrical envelope whose both end portions are closed, two electrode pins that penetrate through both end portions of the envelope, and two electrodes (a pair of electrodes) that are supported in parallel with each other by the electrode pins within the envelope.

In such an electron tube, one electrode is disposed so as to face a device such as a burner which generates a flame 300. With this, when one electrode is irradiated with ultraviolet rays in a state where a predetermined voltage is applied across the electrodes, electrons are emitted from the electrode due to the photoelectric effect and excited in succession one after another to cause an electron avalanche between one electrode and the other electrode. This changes the voltage, current, and impedance between the electrodes.

The external power supply 2 includes a commercial AC power supply having a voltage value of, for example, 100 V or 200 V.

The calculating device 3 includes a power supply circuit 11 connected to the external power supply 2, an applied voltage generating circuit 12 and a trigger circuit 13 connected to the power supply circuit 11, a voltage dividing resistor 14 including resistors R1 and R2 connected in series between a downstream side terminal 1b of the flame sensor 1 and a ground line GND, a current detecting circuit 15 for detecting a voltage (reference voltage) Va generated at a connection point Pa between the resistors R1 and R2 of the voltage dividing resistor 14 as current I flowing through the flame sensor 1, and a processing circuit 16 to which the applied voltage generating circuit 12, the trigger circuit 13, and the current detecting circuit 15 are connected.

The power supply circuit 11 supplies AC electric power input from the external power supply 2 to the applied voltage generating circuit 12 and the trigger circuit 13. In addition, the electric power for driving the calculating device 3 is obtained from the power supply circuit 11 (however, the electric power for driving the calculating device 3 may be obtained from another power supply regardless of whether the electric power is AC power or DC power).

Figure 2:
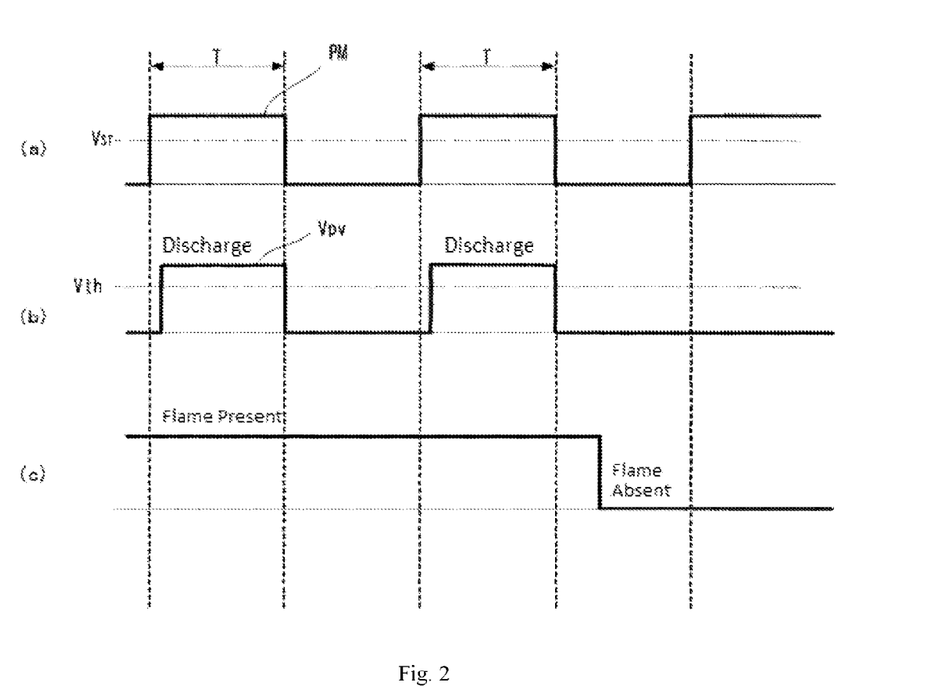
FIG. 2 is a waveform diagram illustrating drive pulses PM applied to a flame sensor, a detected voltage Vpv detected in a current detecting circuit, and the presence or absence of a flame in this flame detecting system.

The applied voltage generating circuit 12 boosts the AC voltage applied by the power supply circuit 11 to a predetermined value and applies the AC voltage to the flame sensor 1. The flame detecting system 100A generates a 200 V pulsed voltage (voltage equal to or more than a discharge starting voltage $V_{ST}$ of the flame sensor 1) in sync with rectangular pulses PS from the processing circuit 16 as drive pulses PM and applies the generated drive pulses PM to the flame sensor 1. FIG. 2(a) illustrates the drive pulses PM to be applied to the flame sensor 1. The drive pulses PM synchronize with the rectangular pulses PS from the processing circuit 16 and the pulse width T thereof is equal to the pulse width of the rectangular pulses PS. The rectangular pulses PS from the processing circuit 16 will be described later.

The trigger circuit 13 detects a predetermined value point of the AC voltage applied by the power supply circuit 11 and inputs the detected result to the processing circuit 16. In the flame detecting system 100A, the trigger circuit 13 detects the minimum value point at which the voltage value is minimized as a predetermined value point (triggering time point). By detecting a predetermined value point regarding an AC voltage in this manner, it is possible to detect one cycle of the AC voltage.

The voltage dividing resistor 14 generates the reference voltage Va as a divided voltage by the resistors R1 and R2 and inputs the reference voltage Va to the current detecting circuit 15. Since the voltage value of the drive pulses PM applied to an upstream side terminal 1a of the flame sensor 1 is a high voltage of 200 V as described above, if the voltage generated at the terminal 1b downstream of the flame sensor 1 is input to the current detecting circuit 15 as is when current flows between the electrodes of the flame sensor 1, a heavy load is applied to the current detecting circuit 15. Accordingly, in the flame detecting system 100A, the voltage dividing resistor 14 generates the reference voltage Va having a low voltage value and inputs the reference voltage Va to the current detecting circuit 15.

The current detecting circuit 15 detects the reference voltage Va input from the voltage dividing resistor 14 as current I flowing through the flame sensor 1 and inputs the detected reference voltage Va to the processing circuit 16 as a detected voltage Vpv.

The processing circuit 16 includes a rectangular pulse generating portion 17, an A/D converting portion 18, a sensitivity parameter storing portion 19, a central processing portion 20, and a determining portion 21.

The rectangular pulse generating portion 17 generates the rectangular pulse PS having the pulse width T each time the trigger circuit 13 detects a triggering time point (that is, every cycle of an AC voltage applied from the power supply circuit 11 to the trigger circuit 13). The rectangular pulses PS generated by the rectangular pulse generating portion 17 are sent to the applied voltage generating circuit 12.

The A/D converting portion 18 performs A/D conversion of the detected voltage Vpv from the current detecting circuit 15 and sends the converted voltage to the central processing portion 20. The sensitivity parameter storing portion 19 stores, as the known sensitivity parameters owned by the flame sensor 1, a reference received light quantity $Q_0$, a reference pulse width $T_0$, a regular discharge probability $P_0$, probabilities $P_N$ ($P_{N1}$, $P_{N2}$, and $P_{N3}$) of discharge other than regular discharge, which will be described later. The probability $P_N$ of discharge other than regular discharge is called the probability $P_N$ of non-regular discharge.

The central processing portion 20 is implemented by hardware including a processor and a memory device and a program for achieving various functions in cooperation with such hardware, and the central processing portion 20 includes a discharge determining portion 201, a discharge probability calculating portion 202, and a received light quantity calculating portion 203.

In the central processing portion 20, the discharge determining portion 201 compares the detected voltage Vpv input from the A/D converting portion 18 with a predetermined threshold voltage Vth (see FIG. 2(b)) each time the drive pulse PM is applied to the flame sensor 1 (each time the rectangular pulse PS is generated) and, when the detected voltage Vpv exceeds the threshold voltage Vth, determines that the flame sensor 1 has discharged.

The discharge probability calculating portion 202 obtains the number n of discharges determined to have occurred by the discharge determining portion 201 each time the number of pulses of the drive pulses PM applied to the flame sensor 1 reaches N (the number of pulses of the rectangular pulses PS reaches N) and calculates the discharge probability P (P=n/N) of the flame sensor 1 based on the obtained number n of discharges and the number N of pulses of the drive pulses PM applied to the flame sensor 1.

The received light quantity calculating portion 203 calculates the received light quantity Q per unit time received by the flame sensor 1 using Equation 8, which will be described later, based on the known sensitivity parameters (the reference received light quantity $Q_0$, the reference pulse width $T_0$, the probability $P_0$ of regular discharge, and the probabilities $P_N$ ($P_{N1}$, $P_{N2}$, and $P_{N3}$) of non-regular discharge) stored in the sensitivity parameter storing portion 19, the pulse width T (pulse width T of the rectangular pulses PS) of the drive pulse PM applied to the flame sensor 1, the probability P (P=n/N) of discharge computed by the discharge probability calculating portion 202.

It should be noted that the calculation of the received light quantity Q with Equation 8 is performed when the discharge probability P is 0<P<1. When the discharge probability P is 0, the received light quantity Q is 0. When the discharge probability P is 1, such processing does not apply.

The received light quantity Q calculated by received light quantity calculating portion 203 is sent to the determining portion 21. The determining portion 21 compares the received light quantity Q from the received light quantity calculating portion 203 with a predetermined threshold Qth and, when the received light quantity Q exceeds the threshold Qth, determines that a flame is present.

About Sensitivity Parameter

It is assumed that the probability that discharge occurs when a single photon collides with the flame sensor 1 is $P_1$ and the probability that discharge occurs when two photons collide with the flame sensor 1 is $P_2$. Since $P_2$ is obtained by subtracting, from 1, the probability that discharge does not occur when the first photon collides with the photoelectric sensor and the second photon collides with the photoelectric sensor, the relationship between $P_1$ and $P_2$ is expressed as Equation 1 below.

[Equation 1]

$$(1-P_2) = (1-P_1)^2 \tag{1}$$

In general, when it is assumed that the probability that discharge occurs when n photons collide is $P_n$ and the probability that discharge occurs when m photons collide is $P_m$, Equation 2 and Equation 3 are established similarly to Equation 1.

[Equation 2]

$$(1-P_n) = (1-P_1)^n \tag{2}$$

[Equation 3]

$$(1-P_m) = (1-P_1)^m \tag{3}$$

The following Equations 4 and 5 representing the relationship between $P_n$ and $P_m$ are drawn based on Equations 2 and 3.

[Equation 4]

$$(1-P_n)^{\frac{1}{n}} = (1-P_m)^{\frac{1}{m}} \tag{4}$$

[Equation 5]

$$(1-P_n) = (1-P_m)^{\frac{n}{m}} \tag{5}$$

The number of photons contributing to discharge is determined by the product of the number Q of photons (received light quantity per unit time) that reach the electrodes of the flame sensor 1 per unit time and time T (pulse width T) for which a voltage equal to or more than the discharge starting voltage $V_{ST}$ is applied to the flame sensor 1. When the reference received light quantity $Q_0$ and the reference pulse width $T_0$ are determined and the discharge probability at this time is defined as $P_0$, the received light quantity Q, the pulse width T, and the discharge probability P at that time are represented by Equation 6 below.

[Equation 6]

$$(1-P) = (1-P_0)^{\frac{QT}{Q_0 T_0}} \tag{6}$$

However, the flame sensor 1 causes the following three types of non-regular discharge when the discharge (discharge that occurs between a pair of electrodes when the received light quantity of the flame sensor 1 is the reference received light quantity $Q_0$ and the pulse width of drive pulses to be applied to the flame sensor 1 is the reference pulse width $T_0$) that occurs at the discharge probability $P_0$ is regular discharge. It should be noted that non-regular discharge means discharge other than regular discharge.

(1) Noise discharge N1 (first type non-regular discharge) that occurs at a constant probability per unit time within the pulse width T of the drive pulses PM and occurs regardless of the number of photons received by the flame sensor 1.

(2) Noise discharge N2 (second type non-regular discharge) that occurs at a constant probability for each of the drive pulses PM1 regardless of the pulse width T of the drive pulses PM and occurs depending on the number of photons received by the flame sensor 1.

(3) Noise discharge N3 (third type non-regular discharge) that occurs at a constant probability for each of the drive pulses PM regardless of the pulse width T of the drive pulses PM and occurs regardless of the number of photons received by the flame sensor 1.

The probabilities $P_N$ of occurrence of these three types of noise discharge are defined as described below.

(1) The probability at which noise discharge N1 occurs per unit time is the probability $P_{N1}$ of the first type non-regular discharge.

(2) The probability at which noise discharge N2 occurs for one drive pulse PM1 when the number of photons is Q is the probability $P_{N2}$ of the second type non-regular discharge.

(3) The probability at which noise discharge N3 occurs for one drive pulse PM1 is the probability $P_{N3}$ of the third type non-regular discharge.

At this time, Equation 6 in which $P_0$ is assumed to be the probability of regular discharge is corrected as indicated in Equation 7.

[Equation 7]

$$(1-P) = (1-P_0)^{\frac{QT}{Q_0 T_0}} \cdot (1-P_{N1})^{\frac{T}{T_0}} \cdot (1-P_{N2})^{\frac{Q}{Q_0}} \cdot (1-P_{N3}) \tag{7}$$

Base on Equation 7, the received light quantity Q per unit time received by the flame sensor 1 can be calculated using Equation 8 below.

[Equation 8]

$$Q = \log_{(1-P_0)^{\frac{T}{Q_0 T_0}} \cdot (1-P_{N2})^{\frac{1}{Q_0}}} \left( \frac{1-P}{(1-P_{N1})^{\frac{T}{T_0}} \cdot (1-P_{N3})} \right) \tag{8}$$

In Equation 8, since the pulse width T is the pulse width (pulse width of the rectangular pulses PS) of the drive pulses PM applied to the flame sensor 1 and known, if the reference received light quantity $Q_0$, the reference pulse width $T_0$, the probability $P_0$ of regular discharge, the probabilities $P_{N1}$, $P_{N2}$, and $P_{N3}$ of non-regular discharge are known, unknown numbers are only the received light quantity Q and the discharge probability P that are being measured.

Accordingly, the flame detecting system 100A calculates the received light quantity Q per unit time received by the flame sensor 1 by applying the N drive pulses PM to the flame sensor 1, making a decision as to whether the flame sensor 1 has discharged for each of the N drive pulses PM, calculating the discharge probability P as P=n/N based on the number N of pulses of the drive pulses PM having been applied to the flame sensor 1 and the number n of times (number of discharges determined to have occurred) the flame sensor 1 has discharged by receiving the drive pulses PM, and substituting the calculated discharge probability P, the known reference received light quantity $Q_0$, the known reference pulse width $T_0$, the known probability $P_0$ of regular discharge, the known probabilities $P_{N1}$, $P_{N2}$, and $P_{N3}$ of non-regular discharge, and the pulse width T into Equation 8.

The reference received light quantity $Q_0$, the reference pulse width $T_0$, the regular discharge probability $P_0$, the probabilities $P_{N1}$, $P_{N2}$, and $P_{N3}$ of non-regular discharge need to be measured by, for example, delivery inspection. Then, the reference received light quantity $Q_0$, the reference pulse width $T_0$, the regular discharge probability $P_0$, the probabilities $P_{N1}$, $P_{N2}$, and $P_{N3}$ of non-regular discharge that have been measured are stored in the sensitivity parameter storing portion 19 in advance as the known sensitivity parameters of the flame sensor 1.

Detection of the Presence or Absence of a Flame

Figure 3:
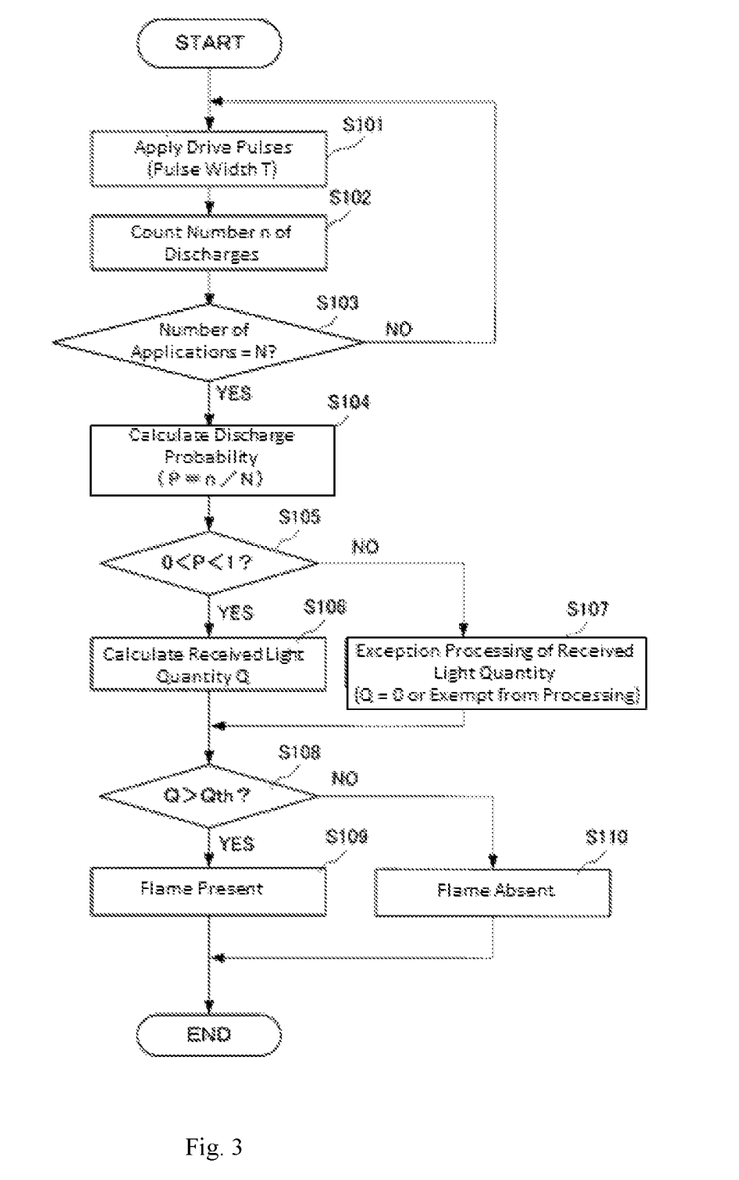
FIG. 3 is a flowchart illustrating an operational process until the presence or absence of a flame is detected in the flame detecting system.

An operational process until the presence or absence of a flame is detected in the flame detecting system 100A will be described with reference to the flowchart illustrated in FIG. 3.

When the trigger circuit 13 detects a triggering time point, the rectangular pulse generating portion 17 generates the rectangular pulse PS and sends the generated rectangular pulse PS to the applied voltage generating circuit 12. With this, the applied voltage generating circuit 12 generates the drive pulse PM having the same pulse width T as the rectangular pulse PS and the generated drive pulse PM having the pulse width T is applied to the flame sensor 1 (step S101).

When the drive pulse PM (voltage equal to or more than the discharge starting voltage $V_{ST}$) has been applied to the flame sensor 1 and the current I has flowed between the electrodes of the flame sensor 1, the current I having flowed between the electrodes of the flame sensor 1 is detected by the current detecting circuit 15 as the detected voltage Vpv and sent to the discharge determining portion 201 via the A/D converting portion 18.

The discharge determining portion 201 compares the detected voltage Vpv from the current detecting circuit 15 with the predetermined threshold voltage Vth and, when the detected voltage Vpv exceeds the threshold voltage Vth, determines that the flame sensor 1 has discharged. When determining that the flame sensor 1 has discharged, the discharge determining portion 201 counts the number n of discharges by 1 (step S102).

Application of the drive pulses PM to the flame sensor 1 in step S101 and counting of the number n of discharges in the flame sensor 1 in step S102 are repeated until the number of applications of the drive pulses PM to the flame sensor 1 reaches the predetermined number N times.

Then, when the number of applications to the flame sensor 1 reaches N (YES in step S103), the discharge probability calculating portion 202 obtains the number n of discharges counted by the discharge determining portion 201 and calculates the discharge probability P (P=n/N) of the flame sensor 1 based on the obtained number n of discharges and the number N of applications of the drive pulses PM to the flame sensor 1 (step S104).

The discharge probability P calculated by the discharge probability calculating portion 202 is sent to the received light quantity calculating portion 203. The received light quantity calculating portion 203 determines whether the discharge probability P meets 0<P<1 and, when the discharge probability P meets 0<P<1 (YES in step S105), calculates the received light quantity Q using Equation 8 above (step S106).

That is, the received light quantity Q per unit time received by the flame sensor 1 is calculated based on the known sensitivity parameters (the reference received light quantity $Q_0$, the reference pulse width $T_0$, the probability $P_0$ of regular discharge, and the probabilities $P_N$ ($P_{N1}$, $P_{N2}$, and $P_{N3}$) of non-regular discharge) stored in the sensitivity parameter storing portion 19, the pulse width T of the drive pulses PM applied to the flame sensor 1, and the probability P (P=n/N) of discharge computed by the discharge probability calculating portion 202.

In contrast, when the discharge probability P does not meet 0<P<1 (NO in step S105), that is, when the discharge probability P is 0 or 1, the received light quantity calculating portion 203 performs the exception processing of received light quantity (step S107). In the exception processing of received light quantity, the received light quantity Q is set to 0 when the discharge probability P is 0 or such processing does not apply when the discharge probability P is 1.

The received light quantity Q calculated by the received light quantity calculating portion 203 is sent to the determining portion 21. The determining portion 21 compares the received light quantity Q from the received light quantity calculating portion 203 with a predetermined threshold Qth and, when the received light quantity Q exceeds the threshold Qth (YES in step S108), determines that a flame is present (step S109). When the received light quantity Q does not exceed the threshold Qth (NO in step S108), the determining portion 21 determines that a flame is not present (step S110).

As is apparent from the above description, the flame detecting system 100A can calculate the received light quantity Q per unit time received by the flame sensor 1 only by calculating the discharge probability P (P=n/N) based on the number N of pulses of the drive pulses PM applied to the flame sensor 1 and the number n of discharges during that time.

The presence or absence of a flame can be detected based on the calculated received light quantity Q. In addition, the known sensitivity parameters used to calculate the received light quantity Q include the probabilities $P_N$ ($P_{N1}$, $P_{N2}$, and $P_{N3}$) of non-regular discharge in addition to the probability $P_0$ of regular discharge. With this, the presence or absence of a flame can be detected accurately.

Embodiment 1

However, in the flame detecting system 100A illustrated in FIG. 1 as a reference example, since heat caused by discharge increases the electrode temperature of the flame sensor 1 when the discharge probability P is increased, the relationship between the received light quantity and the discharge probability becomes undefined and the accuracy of the received light quantity Q estimated based on the discharge probability P may be reduced.

Figure 4:
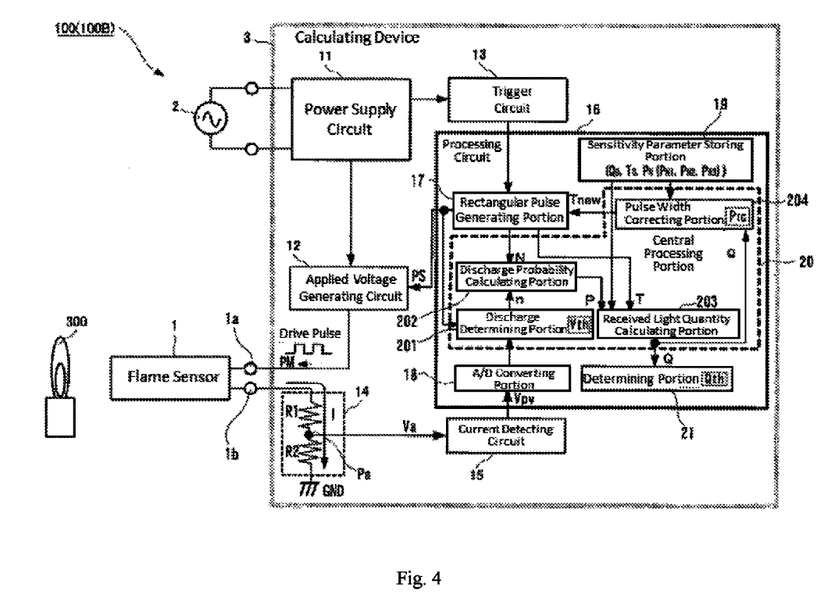
FIG. 4 illustrates the main part of a flame detecting system according to embodiment 1 of the invention.

Accordingly, in a flame detecting system 100 (100B) according to embodiment 1 of the invention (see FIG. 4), the central processing portion 20 is provided with a pulse width correcting portion 204 for correcting the pulse width T of the drive pulses PM applied to the flame sensor 1 so that the discharge probability P obtained based on the number N of pulses of the drive pulses PM and the number n of discharges equals the target discharge probability $P_{TG}$. In FIG. 4, the same reference numerals as in FIG. 1 indicate the same or similar components described with reference to FIG. 1 and descriptions are omitted.

Specifically, the pulse width correcting portion 204 calculates a correction value $T_{new}$ of the pulse width T of the drive pulses PM using Equation 9 below based on the known sensitivity parameters (the reference received light quantity $Q_0$, the reference pulse width $T_0$, the probability $P_0$ of regular discharge, and the probabilities $P_N$ ($P_{N1}$, $P_{N2}$, and $P_{N3}$) of non-regular discharge) stored in the sensitivity parameter storing portion 19, the received light quantity Q calculated by the received light quantity calculating portion 203, and the preset target discharge probability $P_{TG}$.

[Equation 9]

$$T_{new} = \log_{\left[(1-P_0)\frac{Q}{Q_0 T_0} \cdot (1-P_{N2})\frac{1}{T_0}\right]}\left(\frac{1-P}{(1-P_{N1})^{\frac{Q}{Q_0}} \cdot (1-P_{N3})}\right) \quad (9)$$

Equation 9 is obtained based on Equation 8 and, by substituting a target discharge probability $P_{TG}$ into P of Equation 9, the pulse width $T_{new}$ of the drive pulses PM (from which the target discharge probability $P_{TG}$ is expected to be obtained) can be obtained based on the known sensitivity parameters (the reference received light quantity $Q_0$, the reference pulse width $T_0$, the probability $P_0$ of regular discharge, and the probabilities $P_N$ ($P_{N1}$, $P_{N2}$, and $P_{N3}$) of non-regular discharge) stored in the sensitivity parameter storing portion 19 and the previous received light quantity Q calculated by the received light quantity calculating portion 203.

The pulse width correcting portion 204 sends the pulse width $T_{new}$ calculated based on Equation 9 to the rectangular pulse generating portion 17 as the correction value of the pulse width T. With this, the pulse width T of the rectangular pulses PS generated by the rectangular pulse generating portion 17 becomes $T_{new}$ and the pulse width T of the drive pulses PM generated by the applied voltage generating circuit 12 is corrected (adjusted) to $T_{new}$.

Figure 5:
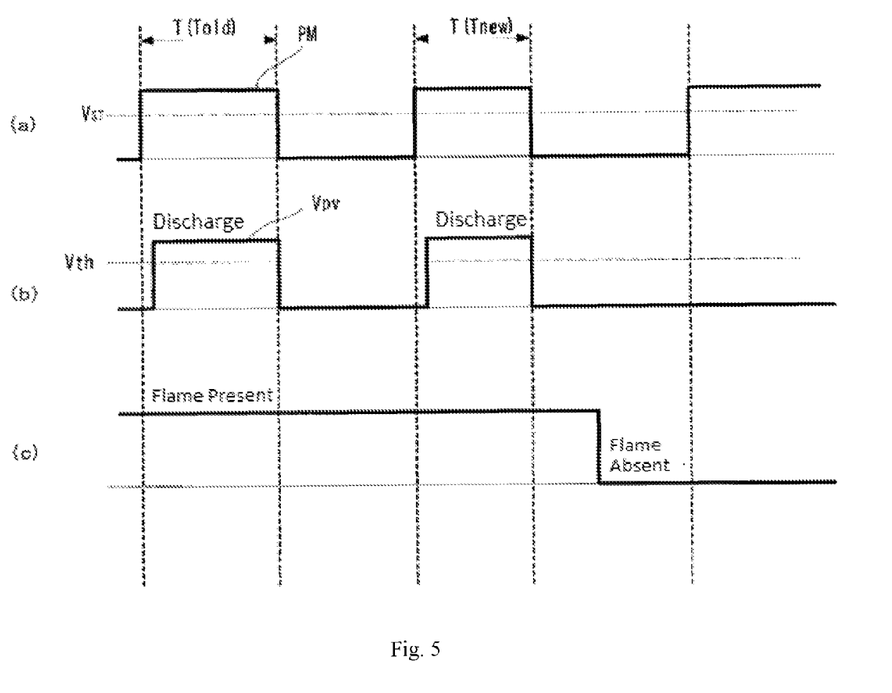
FIG. 5 is a waveform diagram illustrating drive pulses PM applied to a flame sensor, a detected voltage Vpv detected in a current detecting circuit, and the presence or absence of a flame in the flame detecting system according to embodiment 1.

That is, as illustrated in FIG. 5, when the pulse width T of the previous drive pulse PM applied to the flame sensor 1 is assumed to be $T_{old}$, the pulse width T of the next drive pulse PM applied to the flame sensor 1 is adjusted to $T_{new}$ so that the next discharge probability P calculated by discharge probability calculating portion 202 equals the target discharge probability $P_{TG}$.

Figure 6:
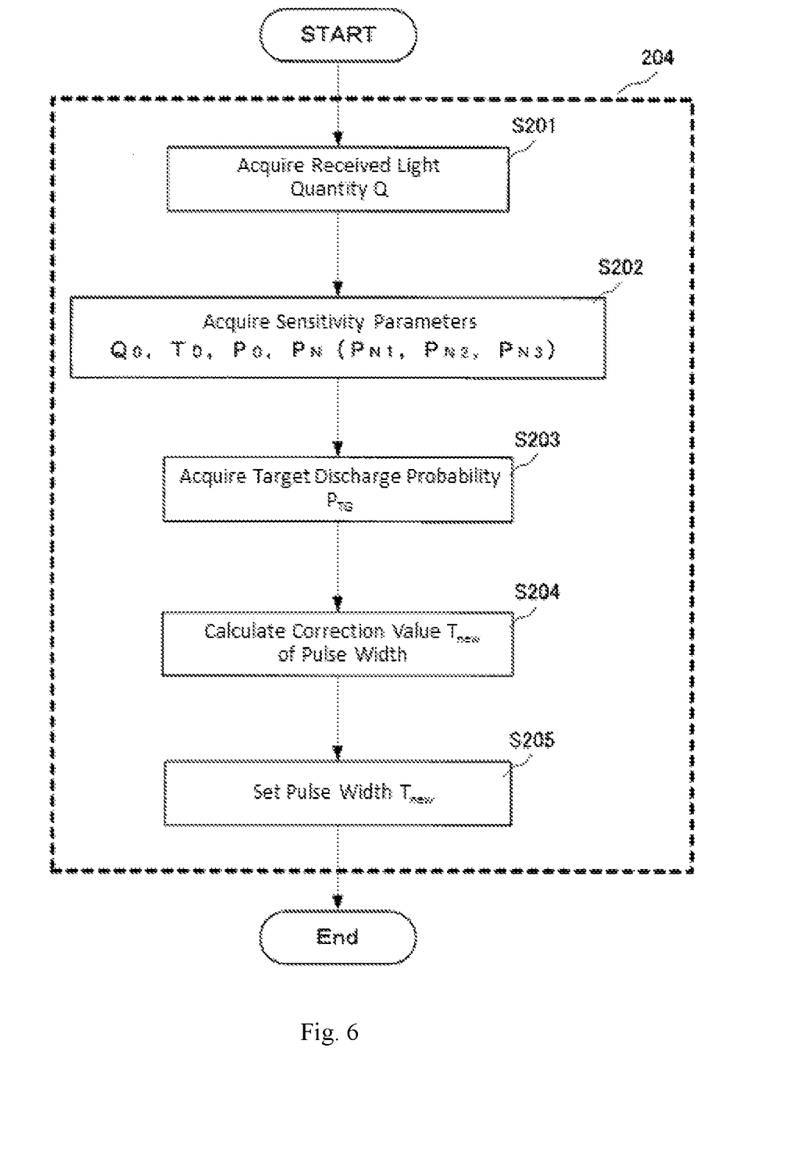
FIG. 6 is a flowchart illustrating processing operation performed in a pulse width correcting portion of the flame detecting system according to embodiment 1.

FIG. 6 is a flowchart illustrating processing operation performed by the pulse width correcting portion 204. The pulse width correcting portion 204 performs the processing operation that follows the flowchart each time the received light quantity calculating portion 203 calculates the received light quantity Q.

The pulse width correcting portion 204 obtains, as the previous received light quantity Q, the received light quantity Q calculated by the received light quantity calculating portion 203 (step S201).

In addition, the pulse width correcting portion 204 obtains the known sensitivity parameters (the reference received light quantity $Q_0$, the reference pulse width $T_0$, the probability $P_0$ of regular discharge, and the probabilities $P_N$ ($P_{N1}$, $P_{N2}$, and $P_{N3}$) of non-regular discharge) stored in the sensitivity parameter storing portion 19 (step S202). In addition, the pulse width correcting portion 204 obtains the preset target discharge probability $P_{TG}$ (step S203). It should be noted that the target discharge probability $P_{TG}$ may be stored in the sensitivity parameter storing portion 19 in advance.

Then, the pulse width correcting portion 204 calculates the correction value $T_{new}$ of the pulse width T by substituting, into Equation 9, the previous received light quantity Q obtained in step S201, the known sensitivity parameters (the reference received light quantity $Q_0$, the reference pulse width $T_0$, the probability $P_0$ of regular discharge, and the probabilities $P_N$ ($P_{N1}$, $P_{N2}$, and $P_{N3}$) of non-regular discharge) obtained in step S202, and the target discharge probability $P_{TG}$ obtained in step S203 (step S204).

Then, the pulse width correcting portion 204 sends the obtained correction value $T_{new}$ of the pulse width T to the rectangular pulse generating portion 17 (step S205). With this, the pulse width $T_{new}$ is set for the rectangular pulse generating portion 17, the pulse width T (pulse width T of the drive pulses PM applied to the flame sensor 1) of the drive pulses PM generated by the applied voltage generating circuit 12 is adjusted to the correction value $T_{new}$ obtained by the pulse width correcting portion 204.

In this way, in the flame detecting system 100B according to embodiment 1, the pulse width T of the drive pulses PM is adjusted so that the discharge probability P equals the target discharge probability $P_{TG}$ and the accuracy of the received light quantity Q estimated from the discharge probability P can be improved by keeping the electrode temperature of the flame sensor 1 constant. With this, the presence or absence of a flame can be detected more accurately than the flame detecting system 100A illustrated in FIG. 1 as a reference example.

Embodiment 2

Figure 7:
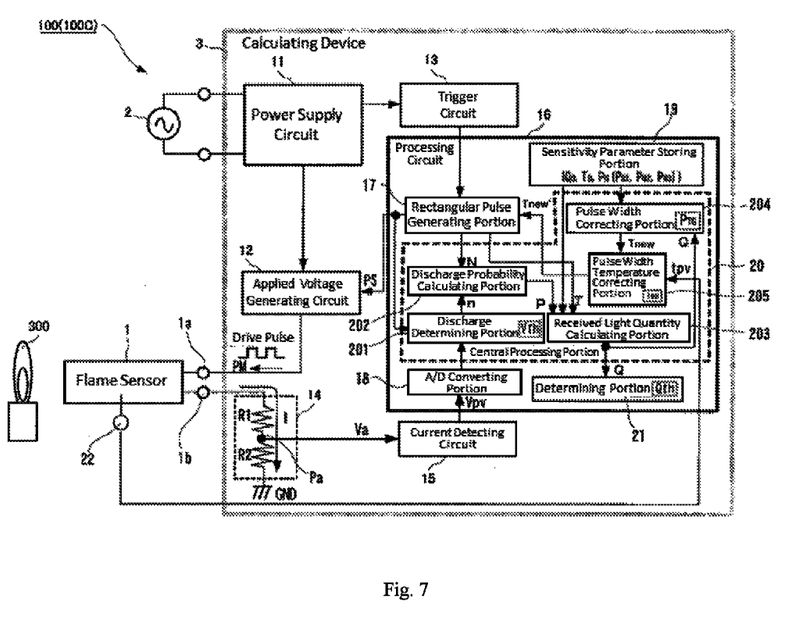
FIG. 7 illustrates the main part of a flame detecting system according to embodiment 2 of the invention.

FIG. 7 illustrates the main part of a flame detecting system 100 (100C) according to embodiment 2 of the invention. In this drawing, the same reference numerals as in FIG. 4 indicate the same or similar components described with reference to FIG. 4 and descriptions are omitted.

The flame detecting system 100C has a temperature sensor 22 for detecting the electrode temperature of the flame sensor 1 and a pulse width temperature correcting portion 205 in the central processing portion 20 so as to send an electrode temperature tpv of the flame sensor 1 detected by the temperature sensor 22 to the pulse width temperature correcting portion 205.

In addition, the pulse width temperature correcting portion 205 compares the electrode temperature tpv of the flame sensor 1 from the temperature sensor 22 with a preset reference electrode temperature tsp and further corrects the correction value $T_{new}$ of the pulse width T from the pulse width correcting portion 204 to the rectangular pulse generating portion 17 so that the difference between the electrode temperature tpv and the reference electrode temperature tsp equals 0 and sends the corrected value as a correction value $T_{new}$' to the rectangular pulse generating portion 17.

Figure 8:
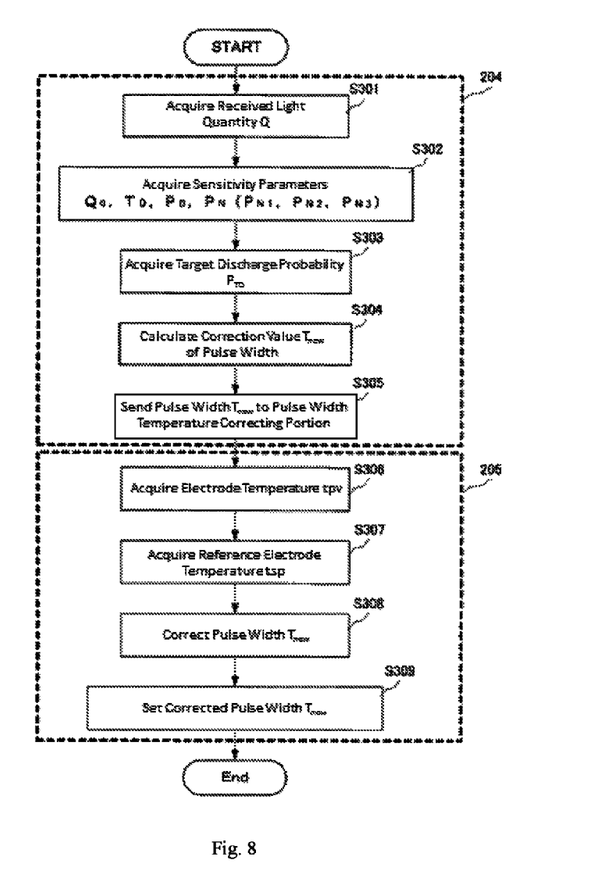
FIG. 8 is a flowchart illustrating processing operation performed in a pulse width correcting portion and a pulse width temperature correcting portion of the flame detecting system according to embodiment 2.

FIG. 8 is a flowchart illustrating processing operation performed by the pulse width correcting portion 204 and the pulse width temperature correcting portion 205. The pulse width correcting portion 204 and the pulse width temperature correcting portion 205 perform the processing operation that follows the flowchart each time the received light quantity calculating portion 203 calculates the received light quantity Q.

The pulse width correcting portion 204 obtains, as the previous received light quantity Q, the received light quantity Q calculated by the received light quantity calculating portion 203 (step S301).

In addition, the pulse width correcting portion 204 obtains the known sensitivity parameters (the reference received light quantity $Q_0$, the reference pulse width $T_0$, the probability $P_0$ of regular discharge, and the probabilities $P_N$ ($P_{N1}$, $P_{N2}$, and $P_{N3}$) of non-regular discharge) stored in the sensitivity parameter storing portion 19 (step S302). In addition, the pulse width correcting portion 204 obtains the preset target discharge probability $P_{TG}$ (step S303). It should be noted that the target discharge probability $P_{TG}$ may be stored in the sensitivity parameter storing portion 19 in advance.

Then, the pulse width correcting portion 204 calculates the correction value $T_{new}$ of the pulse width T by substituting, into Equation 9, the previous received light quantity Q obtained in step S301, the known sensitivity parameters (the reference received light quantity $Q_0$, the reference pulse width $T_0$, the probability $P_0$ of regular discharge, and the probabilities $P_N$ ($P_{N1}$, $P_{N2}$, and $P_{N3}$) of non-regular discharge) obtained in step S302, and the target discharge probability $P_{TG}$ obtained in step S303 (step S304) and sends the calculated correction value $T_{new}$ of the pulse width T to the pulse width temperature correcting portion 205 (step S305).

When having received the correction value $T_{new}$ of the pulse width T from the pulse width correcting portion 204, the pulse width temperature correcting portion 205 obtains the electrode temperature tpv of the flame sensor 1 from the temperature sensor 22 (step S306). In addition, the pulse width temperature correcting portion 205 obtains the preset reference electrode temperature tsp (step S307). It should be noted that the reference electrode temperature tsp may be stored in the sensitivity parameter storing portion 19 in advance.

Then, the pulse width temperature correcting portion 205 further corrects the correction value $T_{new}$ of the pulse width T from the pulse width correcting portion 204 (step S308) so that the difference between the electrode temperature tpv obtained in step S306 and the reference electrode temperature tsp obtained in step S307 equals 0 and sends the corrected correction value $T_{new}$ of the pulse width T to the rectangular pulse generating portion 17 as $T_{new}$' (step S309).

With this, the pulse width $T_{new}$' is set for the rectangular pulse generating portion 17, the pulse width T (pulse width T of the drive pulses PM applied to the flame sensor 1) of the drive pulses PM generated by the applied voltage generating circuit 12 is adjusted to the correction value $T_{new}$' further corrected by the pulse width temperature correcting portion 205.

In this way, in the flame detecting system 100C according to embodiment 2, the pulse width T of the drive pulses PM is adjusted so that the discharge probability P equals the target discharge probability $P_{TG}$ and the electrode temperature tpv of the flame sensor 1 equals the reference electrode temperature tsp, and the accuracy of the received light quantity Q estimated from the discharge probability P can be improved by keeping the electrode temperature tpv of the flame sensor 1 at the reference electrode temperature tsp. With this, the presence or absence of a flame can be detected more accurately than the flame detecting system 100B according to embodiment 1.

Although the probability $P_{N1}$ of the first type non-regular discharge, the probability $P_{N2}$ of the second type non-regular discharge, and the probability $P_{N3}$ of the third type non-regular discharge are used as the probabilities $P_N$ of non-regular discharge in embodiments 1 and 2 above, all of the probabilities $P_{N1}$, $P_{N2}$, and $P_{N3}$ of non-regular discharge are not necessarily used. That is, any one of them may be used or a combination of any two of them may be used.

For example, when only the probability $P_{N1}$ of the first type non-regular discharge is used, the probability $P_{N2}$ of the second type non-regular discharge and the probability $P_{N3}$ of the third type non-regular discharge only need to be set to 0 in Equation 8. In addition, when only the probability $P_{N2}$ of the second type non-regular discharge is used, the probability $P_{N1}$ of the first type non-regular discharge and the probability $P_{N3}$ of the third type non-regular discharge only need to be set to 0 in Equation 8. In addition, when only the probability $P_{N3}$ of the third type non-regular discharge is used, the probability $P_{N1}$ of the first type non-regular discharge and the probability $P_{N2}$ of the second type non-regular discharge only need to be set to 0 in Equation 8.

In addition, the probabilities $P_N$ of non-regular discharge are not limited to the probabilities of $P_{N1}$, $P_{N2}$, and $P_{N3}$ of non-regular discharge (noise discharge N1, N2, and N3) defined as described above in the invention.

In addition, although the drive pulses PM generated by the applied voltage generating circuit 12 are replaced with the rectangular pulses PS generated by the rectangular pulse generating portion 17 and the number N of pulses and the pulse width T of the rectangular pulses PS are used as the number N of pulses and the pulse width T of the drive pulses PM in embodiments 1 and 2 above, the number N of pulses and the pulse width T of the actual drive pulses PM generated by the applied voltage generating circuit 12 may be used.

Expansion of Embodiment

Although the invention has been described with reference to the above embodiments, the invention is not limited to the above embodiments. Various changes understandable to those skilled in the art can be made to the structure and details of the invention within the technical spirit of the invention.

For example, although the external power supply 2 is an AC commercial power source as illustrated in FIGS. 1, 4, and 7 in embodiments 1 and 2, a DC power source may be used instead. In this case, the power supply circuit 11 applies a DC voltage having a predetermined voltage value to the applied voltage generating circuit 12 and the trigger circuit 13, the trigger circuit 13 applies a DC voltage having a predetermined rectangular waveform to the rectangular pulse generating portion 17 by turning on and off the applied DC current at predetermined cycles, and the rectangular pulse generating portion 17 may be configured so as to generate the rectangular pulses PS from the DC voltage having a rectangular waveform and output the generated rectangular pulses PS.

For example, shutter functionality can be provided on the envelope of the flame sensor for use in a flame detecting system for detecting a pseudo flame. Although deformation is made in a matter of design, the deformation is also included in the scope of the invention.

In addition, the concept of an effective electrode surface area may be introduced to the flame sensor. Then, it is possible to calculate the brightness of the flame by dividing the received light quantity by the effective electrode surface area. The effective electrode surface area means the area on which light impinges of the electrode surface area of the flame sensor and the effective electrode surface area is a parameter unique to the flame sensor.

DESCRIPTION OF REFERENCE NUMERALS AND SIGNS

1: flame sensor, 2: external power supply, 3: calculating device, 11: power supply circuit, 12: applied voltage generating circuit, 13: trigger circuit, 14: voltage dividing resistor, 15: current detecting circuit, 16: processing circuit, 17: rectangular pulse generating portion, 18: A/D converting portion, 19: sensitivity parameter storing portion, 20: central processing portion, 21: determining portion, 22: temperature sensor, 100 (100A, 100B, 100C): flame detecting system, 201: discharge determining portion, 202: discharge probability calculating portion, 203: received light quantity calculating portion, 204: pulse width correcting portion, 205: pulse width temperature correcting portion, 300: flame

The invention claimed is:
1. A flame detecting system comprising:
a flame sensor configured to have a pair of electrodes and detect light generated from a flame;
an applied voltage generating device configured to periodically generate a pulsed voltage and apply the pulsed voltage across the pair of electrodes of the flame sensor as drive pulses;
a current detecting device configured to detect current flowing through the flame sensor;
a storage device for storing, as known sensitivity parameters owned by the flame sensor, at least a reference received light quantity $Q_0$ of the flame sensor, a reference pulse width $T_0$ of the drive pulses applied across the pair of electrodes of the flame sensor, a probability $P_0$ of a regular discharge generated between the pair of electrodes, and a probability $P_N$ of a discharge other than the regular discharge, a received light quantity of the flame sensor being the reference received light quantity $Q_0$, a pulse width of the drive pulses applied to the flame sensor being the reference pulse width $T_0$;
a number-of-discharges counting portion configured to count a number n of discharges determined to have occurred across the pair of electrodes of the flame sensor based on the current detected by the current detecting device when the drive pulses generated by the applied voltage generating device are applied across the pair of electrodes of the flame sensor;
a received light quantity calculating portion configured to calculate a received light quantity Q per unit time received by the flame sensor based on the known sensitivity parameters stored in the storage device, a pulse width T and a number N of pulses of the drive pulses applied across the pair of electrodes of the flame sensor by the applied voltage generating device, and the number n of discharges counted by the number-of-discharges counting portion when the drive pulses are applied across the pair of electrodes of the flame sensor; and
a pulse width correcting portion configured to correct the pulse width T of the drive pulses generated by the applied voltage generating device so that a discharge probability P obtained based on the number N of pulses of the drive pulses and the number n of discharges equals a predetermined target discharge probability $P_{TG}$.

2. The flame detecting system according to claim 1, further comprising:
an electrode temperature detecting device configured to detect an electrode temperature of the flame sensor; and
a pulse width temperature correcting portion configured to further correct the corrected pulse width T by the pulse width correcting portion based on a difference between the electrode temperature detected by the electrode temperature detecting device and a predetermined reference electrode temperature.

3. The flame detecting system according to claim 1, wherein the pulse width correcting portion is configured to calculate a correction value $T_{new}$ of the pulse width T of the drive pulses using the known sensitivity parameters stored in the storage device, the received light quantity Q per unit time calculated by the received light quantity calculating portion, and the predetermined target discharge probability $P_{TG}$.

* * * * *